May 19, 1964   W. E. POHL   3,133,814
METHOD OF MAKING COLORED PICTURES
Filed June 21, 1961   2 Sheets-Sheet 1

INVENTOR.
Wadsworth E. Pohl
BY
Roberts, Cushman + Grover
ATT'YS

May 19, 1964  W. E. POHL  3,133,814
METHOD OF MAKING COLORED PICTURES
Filed June 21, 1961  2 Sheets-Sheet 2

United States Patent Office 3,133,814
Patented May 19, 1964

3,133,814
METHOD OF MAKING COLORED PICTURES
Wadsworth E. Pohl, Los Angeles, Calif., assignor to Technicolor Corporation of America, Hollywood, Calif., a corporation of Maine
Filed June 21, 1961, Ser. No. 118,655
7 Claims. (Cl. 96—2)

This invention relates to the production of multi-color pictures, either motion pictures or still pictures, from black-and-white or monochrome originals.

Objects of the invention are to provide a method of the kind referred to which is simple and economical, and which can be performed rapidly and accurately.

According to the present invention the method comprises forming a transparency of a monochrome original, covering one side of the transparency with a light-transmissive sheet of colorable material, illuminating the other side of the transparency with diffused light, coloring the areas of the sheet occupied by different objects of the scene different colors selected for the different objects respectively, preferably the approximate colors of the objects in the scene depicted, and photographing the colored sheet on color film. The color film is preferably exposed through the monochrome original. However it may be exposed directly and then printed on color film through the monochrome original. Preferably the transparency is an enlargement and the colored sheet is photographed on the color film with light refletced from the colored sheet. In the preferred embodiment the monochrome original is a transparent positive printed from a negative of the same size, and the positive transparency is printed from the same negative by projection printing. Preferably the sheet of colorable material is applied to the emulsion side of the positive transparency, the coloring material is opaque and is applied uniformly over each area, and in photographing the colored sheet its side opposite the colored side is presented to the camera.

For the purpose of illustration a typical embodiment of the invention is shown in the accompanying drawings in which FIG. 1 illustrates the step of printing a monochrome positive from the monochrome negative;

FIGS. 1a to 4a illustrate the same steps in a different way showing the register holes in the various negatives, positives and colored sheet;

Figure 1:
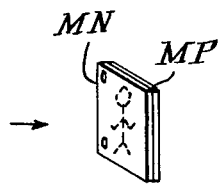
Figure 1A:
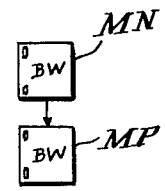
Figure 2:
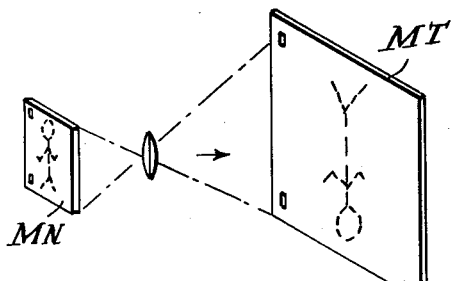
FIG. 2 illustrates the step of forming a transparencey from a monochrome negative.
Figure 3:
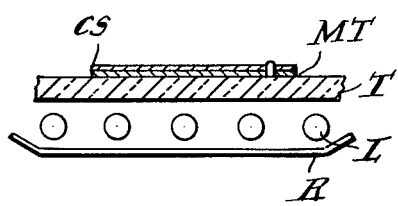
FIG. 3 illustrates the steps of covering one side of the transparency with a light-transmissive sheet of colorable material and illuminating the other side of the transparency with diffused light.
Figure 4:
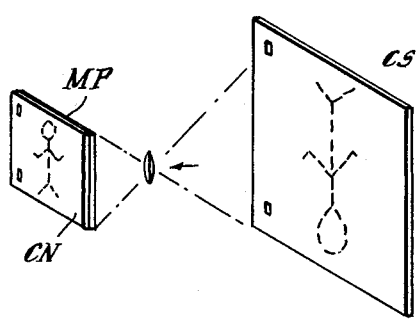
FIG. 4 illustrates the step of making a color negative from the transparent positive and the colored sheet.
Figure 4A:
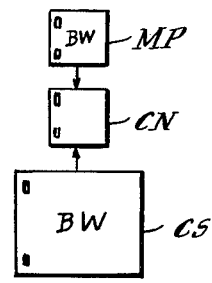

As shown in FIG. 1 a monochrome positive MP is printed from a monochrome negative MN, and as shown in FIG. 2 an enlarged monochrome transparency MT is formed from the same monochrome negative MN by projection printing. As shown in FIG. 3 the monochrome transparency MT is laid over a transparent support T which is illuminated from the back by lamps L and a reflector R, the support T being formed of opal glass or the like to diffuse the light. Over one side of the monochrome transparency is laid the colorable sheet CS of transparent material and the different areas of the sheet are uniformly painted different colors selected for the different objects in the scene. In coloring the sheet CS opaque pigments should be used. Then, as shown in FIG. 4, a color negative CN is printed with light reflected from sheet CS through the monochrome positive MP.

Figure 2A:
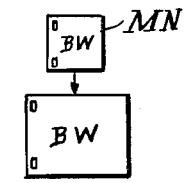
Figure 3A:
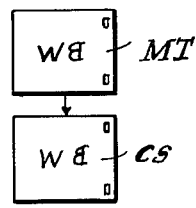

In the various printing operations it will be understood of course that the films are held in a registry by suitable means such as register pins, and FIGS. 1a to 4a illustrate the position of the register holes in the various films. By comparing FIGS. 2a and 3a it will be evident that after exposure and development the monochrome transparency MT is turned over before the colorable sheet CS is laid over it. In FIG. 3a it is apparent that the monochrome transparency MT presents a positive mirror image of the subject. By comparing FIGS. 3a and 4a it will be evident that, before it is photographed on color negative CN, the colored sheet is turned over so that its opposite side faces the negative. By reversing colorable sheet CS as shown in 4a, the colorable sheet is on the same register pins on which the monochrome transparency MT was made and the image presented to the color negative is a color positive image without tone scale. Tone scale is provided by the monochrome positive MP. From the color negative CN a color positive may be formed in the usual way.

Figure 5:
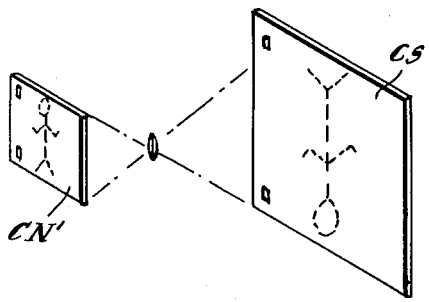
FIGS. 5 and 5a illustrate the step of making an unmodified color negative from the colored sheet.
Figure 5A:
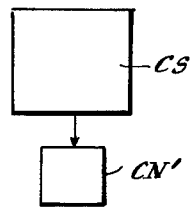
Figure 6:
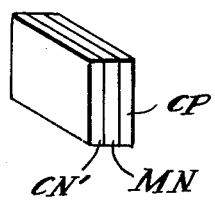
FIGS. 6 and 6a illustrate the step of making a color positive from the monochrome negative and the unmodified color negative.
Figure 6A:
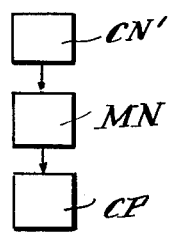

If the original form of the black and white picture is a positive transparency, then a monochrome negative MN must be made from the positive in order to make the enlarged monochrome transparency MT, unless reversal film is used for making the enlargement MT. If the original black-and-white picture is a monochrome negative and it is desired to avoid the loss in image quality which normally occurs in photographic duplication, it is possible to use the monochrome negative MN to modulate the hues in the colored sheet. This has been done by photographing the colored sheet CS without using monochrome positive MP. The color positive paper prints are then made by using the unmodulated color negative with the monochrome negative MN in registered contact. The two negatives together present the same negative image that is achieved in step 4a. Thus as shown in FIGS. 5 and 5a an unmodified color negative CN' is made from the colored sheet CS, and as shown in FIGS. 6 and 6a a color positive CP is made from the monochrome negative MN and the color negative CN'.

It has been proposed to form a multi-color picture from a monochrome original by projecting the original on a sheet of colorful material and, while the picture is thus projected, uniformly painting the areas of the sheet occupied by different objects of the scene different colors in accordance with the color of the different objects respectively and then, with light reflected from the colored sheet, photographing the colored sheet on color film with the monochrome original in contact with the color negative behind an aperture. However with this method the artist casts shadows on the colorable sheet while coloring the sheet.

It should be understood that the present disclosure is for the purpose of illustration only and that this invention includes all modifications and equivalents which fall within the scope of the appended claims.

I claim:

1. The method of producing a color picture from a monochrome original of a plurality of objects which comprises forming an enlarged transparency of the monochrome original, covering one side of the transparency with a light-transmissive sheet of material upon which objects may be painted distinctly, illuminating the other side of the transparency with diffuse light, with opaque paint painting the areas of the sheet occupied by said objects different colors selected for the different objects respectively, and copying the sheet on sensitive color film, said copying including reflecting light from the colored sheet and printing the sensitive color film through said monochrome original with the color film in contact with the monochrome original.

2. The method of producing a color picture from a monochrome original of a plurality of objects which comprises forming a transparency of the monochrome original, covering one side of the transparency with a light-transmissive sheet of material upon which objects may be painted distinctly, illuminating the other side of the transparency with diffuse light, painting the areas of the sheet occupied by said objects different colors selected for the different objects respectively, and by projection printing photographing the colored sheet on color film through said monochrome original, with the color film in contact with the monochrome original.

3. The method of producing a color picture from a monochrome original of a plurality of objects which comprises forming an enlarged transparency of the monochrome original, covering one side of the transparency with a light-transmissive sheet of material upon which objects may be painted distinctly, illuminating the other side of the transparency with diffuse light, with opaque paint painting the areas of the sheet occupied by said objects different colors selected for the different objects respectively, and with light reflected from the colored sheet photographing the sheet on sensitive color film with the monochrome original in contact with the sensitive film.

4. The method of producing a color picture from a monochrome negative of a plurality of objects which comprises forming with the negative a transparent positive of the same size and also an enlarged positive transparency, covering one side of the transparency with a light-transmissive sheet of material upon which objects may be painted distinctly, illuminating the other side of the transparency with diffuse light, painting the areas of the sheet occupied by said objects different colors selected for the different objects respectively, and by projection printing photographing the colored sheet on color film through said transparent positive, with the color film in contact with the transparent positive.

5. The method of producing a color picture from a monochrome negative of a pluraltiy of objects which comprises forming with the negative a transparent positive of the same size and also an enlarged positive transparency, covering one side of the transparency with a light-transmissive sheet of material upon which objects may be painted distinctly, illuminating the other side of the transparency with diffuse light, painting the areas of the sheet occupied by said objects different colors selected for the different objects respectively, and by projection printing with light reflected from the colored sheet photographing the sheet on sensitive color film with said transparent positive in contact with the sensitive film.

6. The method of producing a color picture from a monochrome negative of a plurality of objects which comprises forming with the negative a transparent positive of the same size and also an enlarged positive transparency, covering the emulsion side of the transparency with a light-transmissive sheet of material upon which objects may be painted distinctly, illuminating the other side of the transparency with diffuse light, painting the areas of the sheet occupied by said objects different colors selected for the different objects respectively, and by projection printing photographing the side of said sheet opposite the colored side on color film through said transparent positive, with the color film in contact with the transparent positive.

7. The method of producing a color picture from a monochrome negative of a plurality of objects which comprises forming with the negative an enlarged positive transparency, covering one side of the transparency with a light-transmissive sheet of material upon which objects may be painted distinctly, illuminating the other side of the transparency with diffuse light, painting the areas of the sheet occupied by said objects different colors selected for the different objects respectively, photographing the side of said sheet opposite the colored side on color film to produce a color negative image, and making a color positive print from said color negative with said color negative in registered contact with said monochrome negative.

References Cited in the file of this patent
UNITED STATES PATENTS

| | | |
|---|---|---|
| 1,464,054 | Williams | Aug. 7, 1923 |
| 1,630,916 | Wittenberg | May 31, 1927 |
| 1,861,515 | Williams | June 7, 1932 |
| 2,053,115 | Snyder | Sept. 1, 1936 |
| 2,071,136 | Meinzinger | Feb. 16, 1937 |
| 2,127,829 | O'Brien | Aug. 23, 1938 |
| 2,183,143 | Marx | Dec. 12, 1939 |
| 2,461,469 | Haff | Feb. 8, 1949 |
| 2,927,857 | Pohl | Mar. 8, 1960 |

FOREIGN PATENTS

| | | |
|---|---|---|
| 18,594 | Great Britain | July 14, 1900 |
| 389,808 | Great Britain | June 19, 1931 |